US008457837B2

(12) United States Patent
Flister et al.

(10) Patent No.: US 8,457,837 B2
(45) Date of Patent: Jun. 4, 2013

(54) METHOD AND SYSTEM FOR COLLECTION STATE INFORMATION OF PARTS IN A PASSENGER CABIN OF A VEHICLE

(75) Inventors: Michael Flister, Neu Wulmstorf (DE); Werner Holzer, Buxtehude (DE); Dirk Burow, Owingen (DE); Steffen Lohrke, Hamburg (DE); Ziad Ghadieh, Hamburg (DE); Benjamin Grimlitza, Wentorf (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/279,104

(22) Filed: Oct. 21, 2011

(65) Prior Publication Data

US 2012/0101682 A1 Apr. 26, 2012

Related U.S. Application Data

(63) Continuation of application No. PCT/EP2010/055253, filed on Apr. 21, 2010.

(60) Provisional application No. 61/172,377, filed on Apr. 24, 2009.

(30) Foreign Application Priority Data

Apr. 24, 2009 (DE) ......................... 10 2009 018 772

(51) Int. Cl.
*G06F 7/00* (2006.01)

(52) U.S. Cl.
USPC ......................................................... 701/33.2

(58) Field of Classification Search
USPC .................... 701/29.1, 29.7, 31.1, 33.2, 33.4, 701/36; 702/183, 185
See application file for complete search history.

(56) References Cited

U.S. PATENT DOCUMENTS

| | | | | |
|---|---|---|---|---|
| 4,703,258 | A | 10/1987 | Palesch | |
| 6,127,947 | A * | 10/2000 | Uchida et al. | 340/999 |
| 6,185,540 | B1 * | 2/2001 | Schreitmueller et al. | 705/4 |
| 6,816,762 | B2 | 11/2004 | Hensey et al. | |
| 2007/0055416 | A1 | 3/2007 | Allen | |

FOREIGN PATENT DOCUMENTS

| | | | |
|---|---|---|---|
| DE | 102005037913 | A1 | 2/2007 |
| DE | 102006061714 | A1 | 7/2008 |
| EP | 0192672 | B2 | 12/1993 |
| EP | 1280316 | A2 | 1/2003 |

OTHER PUBLICATIONS

German Office Action for German Application No. 102009018772.3 dated Feb. 2, 2010.
International Search Report for International Application PCT/EP2010/055253 dated Jun. 30, 2010.

* cited by examiner

*Primary Examiner* — Yonel Beaulieu
(74) *Attorney, Agent, or Firm* — Ingrassia Fisher & Lorenz P.C.

(57) ABSTRACT

A method for collecting defect data of parts in a passenger cabin of a vehicle includes, but is not limited to connecting an electronics device allocated to a user to a central communication device, retrieving a user interface provided by the communication device by the electronics device, dialog-based inquiring of defect data of parts by the communication device by way of the user interface on the electronics device, and storing the requested defect data by the communication device in a central data storage unit. The electronics device can be mobile or permanently installed. Mobile electronics devices can be implemented by personal electronics devices of the passengers, which devices were brought into the passenger cabin.

15 Claims, 4 Drawing Sheets

METHOD AND SYSTEM FOR COLLECTION STATE INFORMATION OF PARTS IN A PASSENGER CABIN OF A VEHICLE

CROSS-REFERENCE TO RELATED APPLICATIONS

The application is a continuation of International Application No. PCT/EP2010/055253, filed Apr. 21, 2010, which was published under PCT Article 21(2) and which claims priority to German Patent Application No. 102009018772.3 filed Apr. 24, 2009 and of U.S. Provisional Patent Application No. 61/172,377 filed Apr. 24, 2009, the disclosure of which applications is hereby incorporated herein by reference.

TECHNICAL FIELD

The technical field relates to a method for collecting state information of parts in a passenger cabin of a vehicle, to a system for collecting state information of parts in a passenger cabin of a vehicle, to the use of such a system and to a vehicle comprising a passenger cabin and such a system.

BACKGROUND

For the purpose of acquiring defects in vehicles with a passenger cabin, for example a commercial aircraft, frequently logbooks are used in which manually detected defects in the passenger cabin are acquired. In the case of a commercial aircraft this is usually carried out by a flight attendant. However, since a flight attendant during a flight has to manage numerous other activities, most of the time only before or after a flight is there adequate opportunity to record new defects in the logbook. Based on this fact, defects which where communicated by passengers during the flight might be forgotten between the point in time of communication and the point in time of logbook editing.

Furthermore, manually maintaining a logbook is associated with a certain evaluation effort in order to, at a later stage, take into account detected faults that have been noted in the logbook. This is time consuming in particular in those cases where the logbook contains free-text information where terms used in the description and position of the detected defects cannot be precisely predefined.

EP 1 280 316 A2 shows an electronic variant of a logbook in which various users with different security levels can carry out dialog-based entries of defect data. In this arrangement the authorization of the respective user is checked at the same time. Furthermore, maintenance data generated from this is transmitted to mobile electronics devices for use during a maintenance procedure.

Acquiring part defects as mentioned above, be it in a manual or in an electronic manner, offers an option of acquiring and providing parts defects in a central location; however, with none of the measures described above is it possible to ensure that all the parts defects occurring in a passenger cabin can reliably be acquired. The duration between detecting a defect and finally entering or acquiring it in a logbook can result in detected defects being forgotten. Consequently, passenger satisfaction could decrease if an increased number of defects in a passenger cabin remain.

It may thus be at least one object to provide a method and a system by means of which parts defects occurring in a passenger cabin can be reliably acquired and collected in a central location so that immediate incorporation of all parts defects in a maintenance schedule or the like can be implemented. In addition, other objects, desirable features and characteristics will become apparent from the subsequent summary and detailed description, and the appended claims, taken in conjunction with the accompanying drawings and this background.

SUMMARY

This object is met by a method that shows an advantageous way of collecting defect data of parts in a passenger cabin of a vehicle. The steps described below are implemented. In a first step an electronics device allocated to a user is connected to a central communication device. In this arrangement the term “connecting” does not necessarily denote bringing about a physical connection between two devices, but instead denotes initiation or commencement of communication between the electronics device and the communication device. This may, for example, involve transmitting a request from the electronics device by way of a suitable network to the communication device, to which request the communication device reacts accordingly and is ready for further communication.

After connection has been made the electronics device in a further step retrieves a user interface from the communication device. This means that the electronics device is made to serve as a tool for user input and the exchange of information for a user. By retrieving the user interface and its use or provision on the electronics device it is thus possible for a user to communicate, by way of the electronics device, with the communication device and to exchange data.

Subsequent communication by the user is controlled by way of dialog-based inquiry of defect data of parts, in which inquiry the user is interrogated as intuitively as possible about the type and location of the defect detected. Preferably, in the manner of a cascade in subsequent inquiry processes in each case a few alternatives are proposed to the user for selection, which alternatives can correspondingly be selected by means of an input device such as a keyboard, a collection of operating buttons, a touch-sensitive display or the like. In such a dialog-based inquiry the detected defect is iteratively narrowed down. For example, in a first question an equipment component such as a seat, service unit above the seat, or the like could be selected. After selection of the equipment component possible sub-quantities could be proposed to the user, in which sub-quantities there is a defect. In the case of selection of a seat as the equipment component, the sub-quantities could, for example, be the seatback, seat area, table, display or the like. Following the selection of a relevant sub-quantity it would be possible to ask according to further sub-quantities or already according to individual parts. If, for example, a table has been selected as a sub-quantity, in a subsequent step, for example, the table locking device or the like could be selected as the defective part.

After completion of this dialog-based inquiry the acquired defect data is stored by the communication device in a central data storage unit. The latter may be designed in any manner, be it by means of a database application that is provided on the communication device itself, by an external database in the form of a server, or by an internal or an external storage medium connected to the communication device.

This method provides a particular advantage in that a user or passenger in a passenger cabin does not depend on communicating a detected defect to a vehicle attendant. This precludes the possibility of a detected malfunction being forgotten by the time a vehicle attendant is found. Moreover, this circumvents the danger of a vehicle attendant forgetting this reported malfunction by the time the journey or flight has ended, at which time there is an opportunity to maintain the logbook. Thus if a user detects a defect in a part, which defect is in their immediate surroundings, said user could establish a connection with the communication device, by way of the electronics device allocated to them, and could enter details relating to the detected defect. This defect data is subsequently collected at a central location so that with regular participation of users in the method at any point in time all the detectable defects are acquired and during any maintenance work on the vehicle can correspondingly be taken into account immediately.

The method is to be attuned in such a manner that users do not have to limit themselves to particular sensory organs, but instead can incorporate all their perceptions in the method according to the invention. For example, if it were not possible to undo a table locking device, this could be registered, as could detection of a burnt smell or the like in their vicinity.

The percentage of users who actually implement the method for registering defects could be increased by various measures so that always a sufficiently high percentage of existing defects in the passenger cabin become known. When passengers enter the cabin, or an adequate period of time before the end of the journey or flight, a display on each of the electronics devices in the passenger cabin could be initiated, requesting an indication of passenger satisfaction.

Furthermore, the proposed dialog-based inquiry is particularly advantageous, because it obviates the need for subsequent handling effort which would, for example, be necessary in the case of free-text details. By means of dialog-based inquiry each user could be presented in a targeted manner with only all the possible alternatives from which they can select. In this manner it is not possible for contradictions, inaccuracies or the like to arise, which could be caused by a fuzzy description of a defect. Selection of a detected defect from a quantity of all the possible defects that have been filtered in a dialog-based manner can make it possible in the first place to achieve direct feedback to a maintenance system or to software that generates a maintenance schedule.

In the dialog-based inquiry of defect data, preferably hierarchical inquiry dialogs are generated by the communication device and are transmitted to the electronics device. In this context the term "hierarchical" means that the inquiry dialogs as described above are piece by piece graded from a higher-order entity down to the desired detail, and by means of corresponding input can be controlled by the user as desired. It would be possible to design the hierarchy of these inquiry dialogs as a sub-quantity from a conventional cabin logbook. However, since it has to be assumed that some of the users who participate in the method are technically not particularly adept, the inquiry dialogs should have as flat a hierarchy as possible.

In a particularly advantageous embodiment of the method the electronics device is designed as a mobile electronics device that connects wirelessly to the communication device, retrieves a user interface from the communication device and presents it on a display of the mobile electronics device. This mobile electronics device wirelessly communicates with the communication device for requesting defect data. The device is in no way limited to a particular type of mobile electronics device. It is for example, imaginable for passengers to carry in the passenger cabin their personal mobile telephones, PDAs, laptops, multimedia players with network function, and the like, which can communicate by way of WLAN or Bluetooth. By way of such devices it is easily possible to get connected to the communication device by way of a radio network that exists in the passenger cabin, and to apply the mobile electronics device to utilize the method according to the invention. It can be assumed that user acceptance for utilizing the method is relatively high on their own electronics device, which is normally readily used anyway to pass the time during the journey or flight.

As an alternative or in addition to the above in a likewise advantageous embodiment a permanently installed electronics device with a display can carry out this task. This permanently installed electronics device when required also connects the communication device, presents a user interface on a display associated with the electronics device, and communicates to the communication device for requesting the defect data. Establishing the connection between this electronics device, which for example forms part of an on-board entertainment system (also named IFE for "in-flight entertainment system") can take place wirelessly or by wire. A user interface for requesting data, connected to the communication device, can be presented on a display, which, for example, is located in a backrest or on a swivel arm in an armrest.

Particularly preferably, for the purpose of selecting defective parts to be registered, dialog-based inquiry of defect data comprises a hierarchically structured graphic display of parts. For a user who is technically not experienced it may possibly be too tedious to work through an exclusively text-based menu structure until, from a list of devices, subassemblies or parts that can be found, the desired defective part can be detected. In this context a hierarchic, graphic display is likely to be much more intuitive so that the readiness to participate in the method for requesting defect data is increased.

Furthermore, dialog-based inquiry of defect data can also involve the hierarchically structured net-based presentation of parts or other data, for example if an inquiry relates to a seat number, to an indication of direction, or to a parts group.

The method can be used, without expensive adaptation, universally in many different vehicles. This can be further facilitated if, for example, the communication device retrieves from a database data of parts in the passenger cabin that are notifiable as being defective, wherein the database can be modified in a vehicle-specific manner. In order to carry out the method in different vehicles it is only necessary to adapt the data record. The latter can preferably also be extracted from an existing maintenance system.

Finally, it is particularly advantageous if the requested defect data are directly transmitted to an aircraft maintenance system. In this way the effective loop is closed: as soon as a defect is noticed, by way of a corresponding input by means of dialog-based inquiry, by way of the selection of predefined options, a precise fault description is generated which because of its accuracy can be processed by an algorithm and can be transmitted, by way of a maintenance system, directly to a maintenance schedule. In this manner it can be ensured that all the faults discovered also appear in a maintenance schedule and can be taken into account during regular or unscheduled maintenance of the vehicle.

Furthermore, a system is proposed that is used for collecting defect data of parts in a passenger cabin of a vehicle and that preferably implements the method in a passenger cabin of a vehicle.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
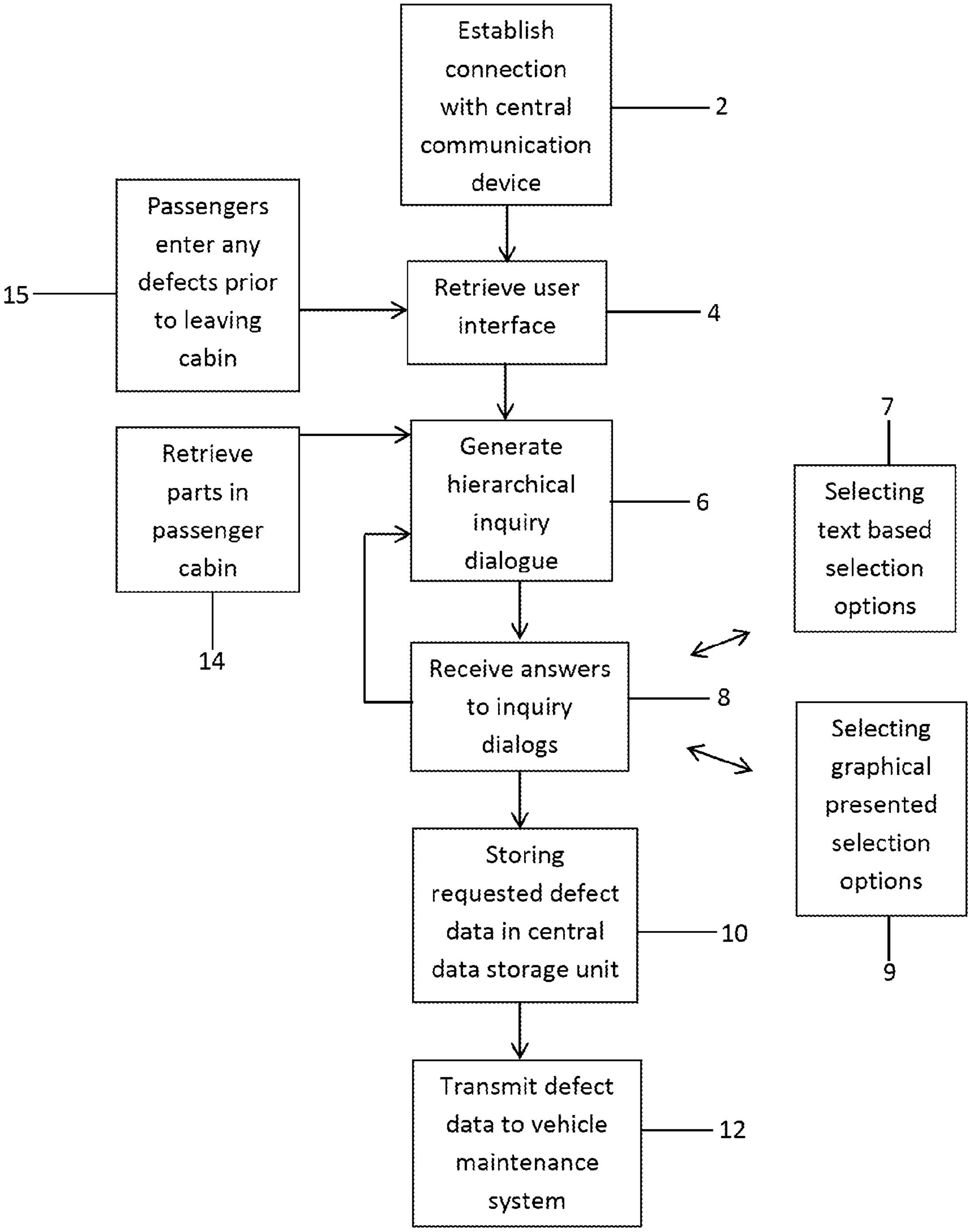
FIG. 1 shows a diagrammatic view of the method according to an embodiment.

In a diagrammatic view in the form of a block diagram FIG. 1 shows a possible way of structuring the method for collecting defect data. First, an electronics device allocated to a user could establish 2 a connection with a central communication device so that further communication is made possible. After a connection has been established 2, the electronics device could then retrieve 4 a user interface provided by the communication device. Consequently it is not necessary, prior to implementing the method, to separately prepare the electronics device by means of dedicated installed software or the like. It is imaginable to use a user interface that is based on already standardized protocols, for example HTTP, and that makes it possible to present data in likewise standardized descriptive languages, for example HTML, XML or the like. Accordingly, a user interface could also be designed as hypertext pages adapted for mobile electronics devices or for displays of an on-board or in-flight entertainment system with which the respective user can interact.

At the latest after retrieval 4 of the user interface the communication device could generate 6 hierarchical inquiry dialogs and could transmit them to the electronics device. It is not necessary for the generation of the inquiry dialogs to take place only after retrieval of the user interface; for example a prefabricated initial dialog could have been generated already at an earlier point in time and could be displayed at the same time as the user interface is retrieved.

The user interacts 8 with the user interface and provides answers in response to the inquiry dialogs to the communication device. Since these are hierarchical inquiry dialogs, the user commences with a higher-order initial dialog and by gradually selecting presented alternatives and possibly by answering various questions obtains a steadily increasing degree of detail by means of which the problem detected by the user in the passenger cabin can be narrowed down in a guided manner. Accordingly, generating 6 and transmitting hierarchical inquiry dialogs are carried out multiple times, and the user needs to interact 8, step-by-step, multiple times with the user interface. This takes place as long as necessary to isolate the problem or the detected defect. This is followed by storing 10 the requested defect data from parts by the communication device in a central data storage unit. Interaction can involve selecting text-based selection options 7 or selecting graphically presented selection options 9, for example the presentation of different parts.

It is particularly advantageous to transmit 12 this requested defect data to a vehicle maintenance system. In this manner it can be ensured that all the requested defect data actually appears in an automatically generated maintenance schedule and the defects can be fixed during a routine or an unscheduled maintenance procedure.

When generating 6 hierarchic inquiry dialogs it can be advantageous to retrieve 14 from a database data of parts in the passenger cabin that are notifiable as being defective. The actual configuration of the passenger cabin can be maintained in this database, and retrieval ensures that the user implementing the method according to the invention has all imaginable alternatives for selecting defects within the passenger cabin actually presented to them. Therefore, users should not be able to detect any defects that cannot be specified by way of the dialog-based inquiry. Updating such a database can be ensured by data transmission with a database unit, a server or the like, and likewise by exchanging an external storage medium or by rewriting an internal storage medium. In a commercial aircraft, for example, a flight attendant prior to the flight after reconfiguration of the passenger cabin could insert a diskette, a memory stick or the like with an updated data record into a control unit installed in the aircraft so that the method can be implemented reliably and completely with current parts data during operation of the vehicle.

Figure 2:
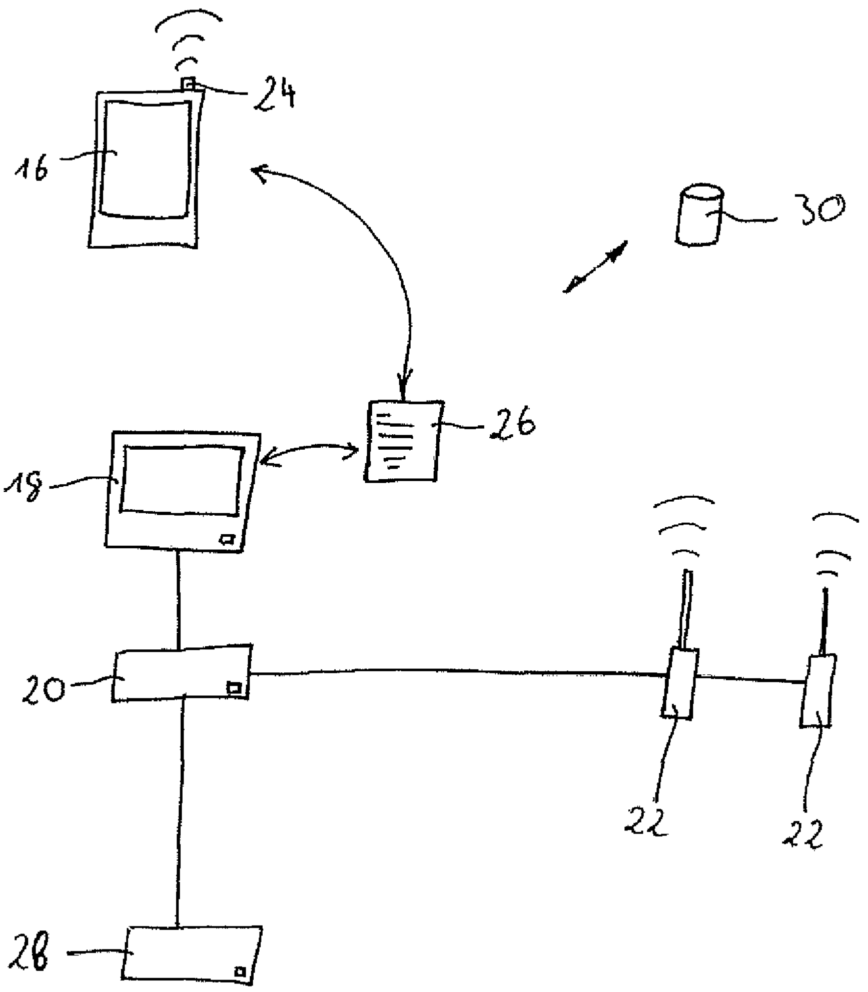
FIG. 2 shows a diagrammatic view of a first exemplary embodiment of the system.

FIG. 2 shows the diagrammatic structure of a system which, for example, comprises a mobile electronics device 16, a communication device 18, a router 20 and one or several data transmission units 22.

As an example, the mobile electronics device 16 is designed, by way of a wireless network connection, to establish a connection with other wireless network components. To this effect said mobile electronics device 16 comprises an internal or external antenna 24 that is connected, by way of a corresponding adapter, to the central arithmetic unit of the mobile electronics device 16. Presently quite a few mobile telephones or PDAs comprise WLAN adapters as standard equipment, and thus easy communication within WLAN is possible so that it can be assumed that there are a large number of suitable mobile electronics devices 16 present in a passenger cabin.

By means of the router 20, which is, for example, connected to the data link units 22, it is possible to provide a network within the passenger cabin. In the case shown as an example, the data link units 22 have been implemented as WLAN antennae or WLAN access points, depending on the type of requirements of the router 20. The data link units 22 are in place at one or several locations within the passenger cabin so that good network coverage within the passenger cabin can be provided. It may be advisable, for the purpose of reducing radiation exposure, to tend towards providing a plural number of data link units 22 within the passenger cabin, and to minimize their respective transmission output and thus range.

The router 20 is, furthermore, connected to the communication device 18, thus providing an interface between the communication device and all the devices gaining access by way of the wireless network.

In the implementation of the method the mobile electronics device 16 could establish a connection to the communication device 18 by way of the data link units 22 and the router 20 in that it logs into the wireless network, obtains a communication address or the like, and prepares the communication device 18 for communication with the mobile electronics device 16. After initiation of this connection it is possible for the communication device 18 to provide a user interface 26 by way of which a dialog-based inquiry of defects of parts becomes possible.

In order to archive the requested defect data the communication device 18 by way of the router 20 could furthermore be connected to a central data storage unit 28. It is not necessary for the data storage unit 28 to be designed as an external server; it is equally imaginable for the communication device 18 to comprise an internal data storage unit 28 so that the detour via the router 20 or other components can be avoided.

A further component of the system could have a database 30 that comprises all the relevant parts data notifiable as being defective, and helps the communication device 18 to generate hierarchical inquiry dialogs based on the current passenger cabin configuration. To this effect, permanent or temporary connection of this database 30 to the communication device 18 is necessary. For example it is imaginable prior to using the vehicle, to establish a one-time connection of the communication device 18 with the database 30 or to permanently integrate the database 30 in the vehicle, and to consult it every time inquiry dialogs are generated.

Figure 3:
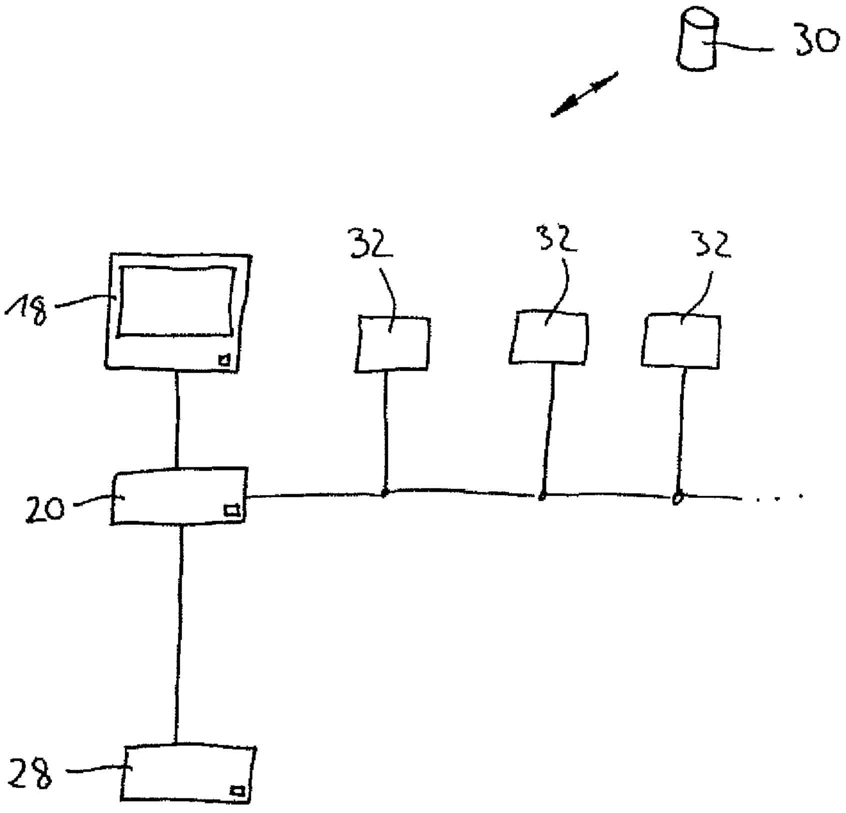
FIG. 3 shows a diagrammatic view of a second exemplary embodiment of the system.

In FIG. 3 a modification of the system according to the invention is presented which differs from the system shown in FIG. 2 in that the electronics devices allocated to the users are not designed as mobile electronics devices 16, but instead are implemented by means of permanently installed electronics devices 32. They can be implemented with permanently installed touch-sensitive display units which normally offer passengers in the passenger cabin entertainment to pass the time spent on board and which are often arranged in the backrest of the seat in front. Such devices should be able to retrieve and display a user interface 26 and to interact with the user. In commercial aircraft there is frequently the option of playing simple games on these display units, and consequently for implementation of the method, because of already existing input facilities and processor performance, it is possible that no additional equipment-related upgrades are required that would be associated with additional expenditure.

Figure 4:
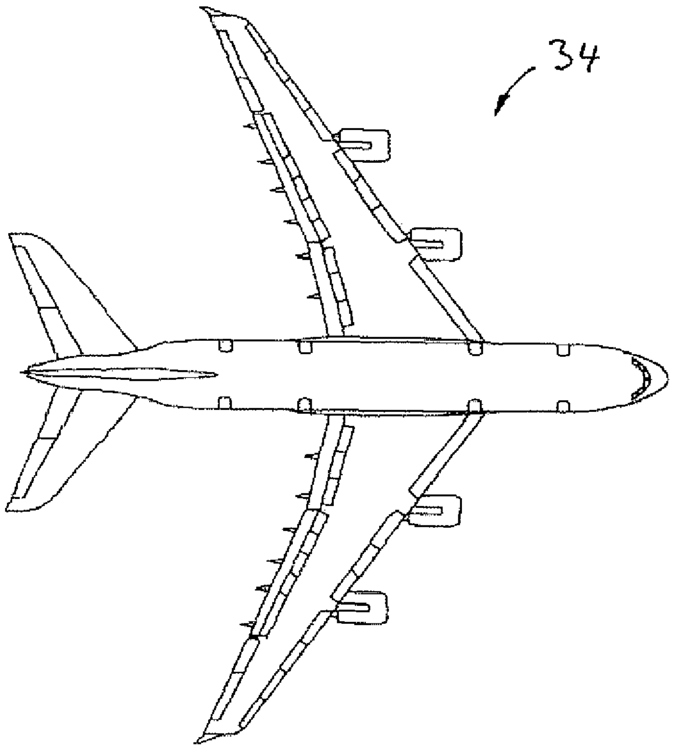
FIG. 4 shows, as an example, an aircraft comprising a system according to an embodiment.

FIG. 4 shows a modern commercial aircraft 34 that for improved collection of defect data could be equipped with a system and that during the flight implements the method.

At this stage it should be emphasized again that the mobile electronics devices 16 can be any electronics devices that have been taken into the passenger cabin by passengers and that frequently are also used to pass the time. However, integration of the method on already permanently installed display units is imaginable as an alternative or in addition. In both cases very high user acceptance can be anticipated, because on the one hand familiar mobile electronics devices can be used to transmit defect data. On the other hand the display units existing on board or other electronics devices are readily used, and it would be possible, especially with these devices, for example during a landing approach in a commercial aircraft, to request 15 a passenger according to FIG. 1 to enter any defects detected in the passenger cabin prior to leaving the cabin.

In both cases this results in a great advantage when compared to the state of the art because direct feedback between a user detecting a defect and a maintenance system can be implemented. There is no detour by way of manually kept logbooks nor any possibly associated time delay, nor the resulting potential of forgetting individual defects.

Furthermore, it should be pointed out that for the communication device 18 to communicate with a mobile electronics device 16 or a permanently installed display unit it is not necessary for the composition of the individual parts shown in FIGS. 2 and 3 to be implemented; for example it would also be possible to provide a routing function already within the communication device 18, and likewise to provide a storage unit 28, and consequently it can be assumed that the system can be implemented with a low level of complexity.

With the use of the method and the system it is also possible to acquire defects which can be acquired only to some extent or not at all by means of sensor-based systems. As a result of the interaction via inquiry dialogs it is possible even for abstract entities such as odors, noises or the like to be entered in a maintenance system, which entities cannot be registered by commonly used defect sensors.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above.

Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for collecting defect data of parts in a passenger cabin of a vehicle, comprising:

connecting one or more of a plurality of electronics devices allocated to a plurality of passengers located within the passenger cabin to a central communication device;

retrieving a user interface provided by the central communication device by one or more of the plurality of the electronics devices;

dialog-based inquiring of defect data of parts by the central communication device by way of the user interface on the one or more of the plurality of electronics devices; and receiving user input from one or more of the plurality of passengers that identifies the defect data of parts in the passenger cabin;

storing the defect data by the central communication device in a central data storage unit, wherein the dialog-based inquiring of the defect data comprises generating hierarchical inquiry dialogs by retrieving from a database data of parts in the at least one passenger cabin that are notifiable as being defective and transmitting hierarchical inquiry dialogs by the central communication device to one or more of the plurality of the electronics devices.

2. The method of claim 1, wherein the electronics device is a mobile electronics device that is configured to:

connect wirelessly to the central communication device;

present a user interface on a display of the mobile electronics device; and wirelessly communicate with the central communication device for requesting the defect data.

3. The method of claim 1, wherein the electronics device is permanently installed in the passenger cabin with a display, the electronics device configured to:

connect to the central communication device;

present a user interface on the display associated with the electronics device; and communicate with the central communication device for requesting the defect data.

4. The method of claim 1, wherein for selecting defective parts to be registered, dialog-based inquiry of the defect data comprises presenting hierarchically structured graphics of parts.

5. The method of claim 1, wherein for selecting defective parts to be registered dialog-based inquiry of the defect data comprises text-based presenting hierarchically structured presentation.

6. The method of claim 1, further comprising transmitting the defect data to a vehicle maintenance system.

7. A system for collecting defect data of parts in a passenger cabin of a vehicle, comprising:

at least one storage unit; and at least one communication device that is configured to:

connect to one or more of a plurality of electronics devices allocated to a plurality of passengers located within the passenger cabin;

provide a user interface for transferring to the plurality of electronics devices;

generate hierarchical inquiry dialogs for acquiring the defect data by retrieving from a database data of parts in the at least one passenger cabin that are notifiable as being defective and transmit the hierarchical inquiry dialogs to each of the plurality of electronics devices for display to each of the plurality of passengers;

receive user input from one or more of the plurality of passengers that identifies the defect data of parts in the at least one passenger cabin by way of the hierarchical inquiry dialogs presentable through one or more of the plurality of electronics devices; and store the defect data in the at least one storage unit.

8. The system of claim 7, further comprising at least one permanently installed electronics device.

9. The system of claim 7, further comprising a wireless communication device configured to wirelessly communicate with a mobile electronics device.

10. The system of claim 7, wherein the at least one communication device is configured to transmit the defect data to a maintenance system of the vehicle.

11. A vehicle, comprising:

at least one passenger cabin; and at least one system configured to collect defect data of parts in the at least one passenger cabin, the at least one system comprising:

at least one storage unit; and at least one communication device configured to:

connect to one or more of a plurality of electronics devices allocated to a plurality of passengers located within the at least one passenger cabin;

provide a user interface for transferring to the plurality of electronics devices;

generate hierarchical inquiry dialogs for acquiring the defect data by retrieving from a database data of parts in the at least one passenger cabin that are notifiable as being defective and transmit the hierarchical inquiry dialogs to each of the plurality of electronics devices for display to each of the plurality of passengers;

receive user input from one or more of the plurality of passengers that identifies the defect data of parts in the at least one passenger cabin by way of the hierarchical inquiry dialogs presentable through each of the plurality of electronics devices; and store the defect data in the at least one storage unit.

12. The vehicle of claim 11, further comprising at least one permanently installed electronics device.

13. The vehicle of claim 11, further comprising a wireless communication device configured to wirelessly communicate with a mobile electronics device.

14. The vehicle of claim 11, wherein the at least one communication device is configured to transmit the defect data to a maintenance system of the vehicle.

15. The vehicle of claim 11, wherein the vehicle is an aircraft.

* * * * *